Figure 4:
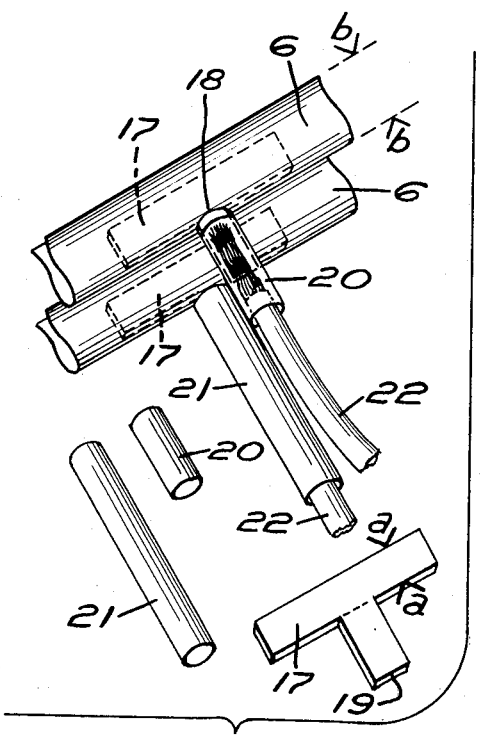

Dec. 5, 1961
L. PANTIN
3,012,217
ELECTRIC OUTLET
Filed Feb. 9, 1959
2 Sheets-Sheet 1
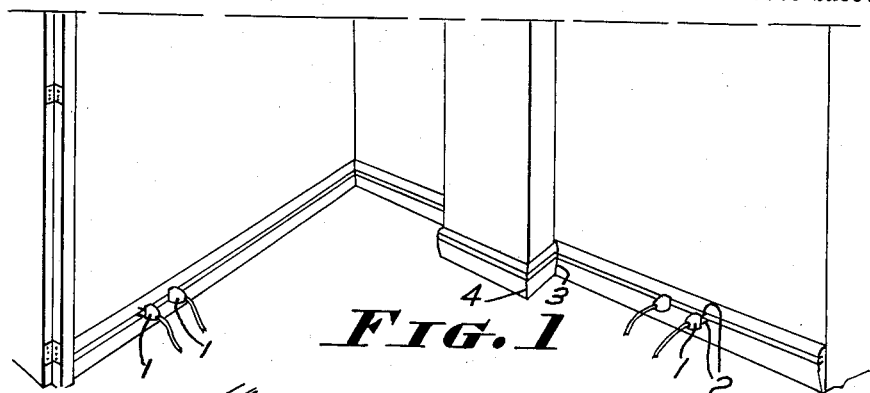
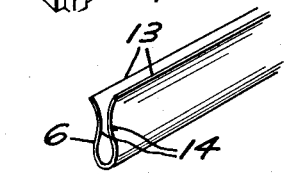
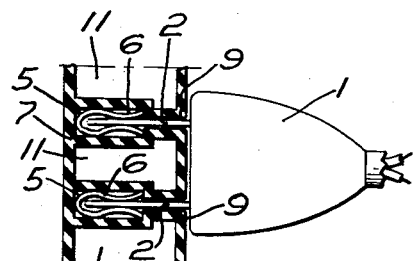
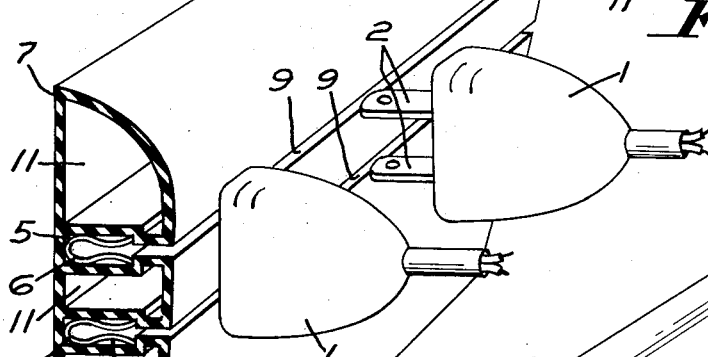
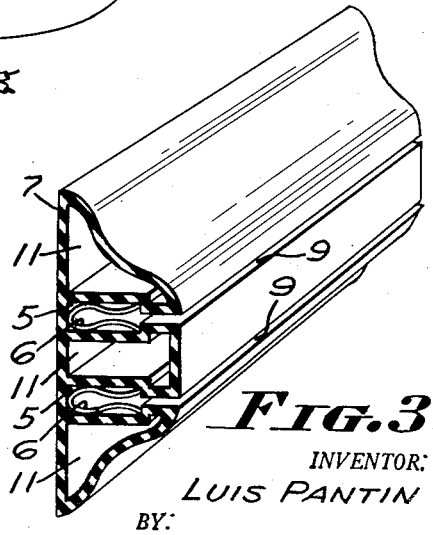
INVENTOR:
LUIS PANTIN
BY:
Beau, Brooks, Buckley & Beau,
ATTORNEYS.

Dec. 5, 1961    L. PANTIN    3,012,217
ELECTRIC OUTLET

Filed Feb. 9, 1959    2 Sheets-Sheet 2

INVENTOR:
LUIS PANTIN
BY:
Beau, Brooks, Buckley & Beau,
ATTORNEYS.

United States Patent Office 3,012,217
Patented Dec. 5, 1961

3,012,217
ELECTRIC OUTLET
Luis Pantin, Apartado 4304 Este, Caracas D.F., Venezuela
Filed Feb. 9, 1959, Ser. No. 792,149
1 Claim. (Cl. 339—21)

The invention refers to an electrical outlet applicable to apartment houses, private residences, industrial buildings, etc. It has special application when a great number of electrical appliances are to be plugged in within the same room and when these appliances have to be moved about frequently. Simultaneously with the advantages pointed out before, this invention serves as a baseboard representing a decorative ensemble in accordance with the room where it is installed. According to the use and the convenience of each particular case, this electrical outlet can be installed in any place and at any height on the walls, either close to the floor or on or close to the ceiling.

FIGURE 1 shows a perspective view from an angle of a room with the apparatus installed indicating (1) an electrical plug, standard type, and the terminals 2 for the contact of the same plug. The fitting to the wall with entrant 3 and salient 4 angles can be observed. FIGURE 2 shows a cross section of the central part of the apparatus in detail with the standard plug 1 connected therewith. The plastic frame 7 is a single structure into which metal conductors 6 are placed inside two special channels 5. These channels 6 are grooved as at 9 all along the apparatus so as to allow the insertion of the terminals 2 of the plug 1 in order to make contact with the metal conductors.

FIGURE 2a represents a perspective of the metal conductors 6, which, as explained, are placed in channel 5, and are held in place by means of their curved out edges 13. Their funnel-shape section facilitates the insertion of the terminals 2 of the plug 1, which are maintained in place by the spring action of the internal central part of the conductor, thus securing the necessary good contact.

FIGURE 3 represents a perspective of the entire apparatus showing each one of its parts and two plugs 1, one plugged in and the other one before plugging in.

The shape of the apparatus is composed of a plastic skeleton with several free empty interior spaces 11 which can be used for the passage of cables for special application and (5) with the special channels for the conductors 6, with continuous grooves 9 which allow the entrance of plugs 1 in order to establish contact with the metal conductor 6, and with a bevel cut 10 to allow fixing to the edge formed by the floor and the wall. The external shape of the apparatus serves decorative purposes. FIGURE 3 shows the way the apparatus is used as baseboard. FIGURE 3a shows an apparatus with a different exterior shape but with the same functional and technical characteristics which can be used at a convenient height on the walls, on the ceiling or on the floor, according to the required use. Wherever the apparatus is used, it is fixed in place with a special cementing or binding material.

FIGURE 4 is a perspective of the system used to supply electric current to the conductors from the general line 22. A metal T-shaped plate 17 is inserted in the conductor, the long branch of the T, 19 going out through an opening 18, cut at the rear curved part of the conductor. To this the cables of the supply line are fixed by means of a metal clamp 20, tubular in shape, and which is tightened by special plyers.

The joint is insulated with a piece of plastic tube 21 which adjusts to the clamp because of its dimensions. The width $a$—$a$ is smaller than width $b$—$b$ of the conductor 6.

This continuous electrical conductor baseboard is manufactured in sections of various length made of resistant material such as plastics. It is easily installed with its internal conductors, occupying very little space. The apparatus is cut with a simple saw allowing the cutting of any desired angle required to join the different sections or to provide for fitting to any change of angle occurring due to special forms of the walls.

What is claimed is:

An electrical baseboard outlet adapted to accommodate a plurality of outlet plugs of the type having two spaced substantially parallel contact members comprising a hollow molded plastic member having a rear flat side adapted to fit against a wall, an upper front side extending outwardly from the top of said rear side, then downwardly therefrom and returning inwardly to said rear side, a complementary lower front side extending outwardly from the bottom of said rear side, then upwardly therefrom and returning inwardly to said rear side, the return of said upper front side and lower front side being spaced apart a distance adapted to accommodate the spaced parallel contact members of an electrical plug, and a spacer member between said upper and lower return members attached to said rear side and forming a confining space between the return of the upper front wall and between the lower front wall and an electrical contact member having a curved rear portion and an upper front portion in each of said confining spaces, with the open front portion being adapted to receive one each of the spaced parallel contact members of an electrical plug said electrical contact member being electrically energized by containing a metal T-shaped plate inserted therein along with the long branch of said T-shaped plate protruding through an opening in the rear curved portion of said contact member, said branch being fixed to an electrical supply line by a metal clamp to form a joint and a plastic tube over said joint.

References Cited in the file of this patent
UNITED STATES PATENTS 1,815,509 Hoecher _____ July 21, 1931
2,478,006 Paden _____ Aug. 2, 1949